United States Patent [19]

Martin et al.

[11] 4,071,788

[45] Jan. 31, 1978

[54] DYNAMOELECTRIC MACHINE FIELD ASSEMBLY

[75] Inventors: Ronald A. Martin, Anderson; Charles R. Ashton, Middletown; Richard D. Watson, Chesterfield, all of Ind.

[73] Assignee: General Motors Corporation, Detroit, Mich.

[21] Appl. No.: 732,499

[22] Filed: Oct. 14, 1976

[51] Int. Cl.² ............................................. H02K 15/02
[52] U.S. Cl. ....................................... 310/42; 310/44; 310/89; 310/218; 310/258
[58] Field of Search ............ 310/42, 44, 89, 216–218, 310/254, 258, 259, 179, 180, 194

[56] References Cited

U.S. PATENT DOCUMENTS

| | | | |
|---|---|---|---|
| 1,897,068 | 2/1933 | Morton | 310/218 |
| 2,134,795 | 11/1938 | Myers | 310/44 X |
| 2,432,117 | 12/1947 | Morton | 310/258 UX |
| 2,445,986 | 7/1948 | Adamson | 310/42 |
| 2,982,873 | 5/1961 | Simmons et al. | 310/218 X |
| 3,021,444 | 2/1962 | Simmons et al. | 310/218 X |
| 3,156,838 | 11/1964 | Winther | 310/42 |
| 3,449,606 | 6/1969 | Preece | 310/218 X |
| 3,597,644 | 8/1971 | Preece | 310/218 X |
| 3,624,441 | 11/1971 | Todd et al. | 310/89 X |
| 3,643,118 | 2/1972 | Ichiki et al. | 310/258 X |
| 3,818,585 | 6/1974 | Preece | 310/216 X |
| 3,912,955 | 10/1975 | Simpson | 310/42 |

Primary Examiner—Donovan F. Duggan
Attorney, Agent, or Firm—C. R. Meland

[57] ABSTRACT

A field assembly for a dynamoelectric machine, particularly for electric engine cranking motors. The field assembly is comprised of a one piece field frame member formed of a high density compacted atomized iron powder. The one piece frame has a generally tubular configuration and has radially inwardly extending pole portions and outer axially extending grooves radially aligned with the pole portions. The frame carries a plurality of field coils which respectively circumscribe the pole portions of the frame. A pole face plate engages each end of a respective pole portion of the frame and a part of each field coil is located between a face plate and an inner wall of the frame. The pole plates are fixed to the frame by parts extending therefrom which pass through openings formed in the frame that extend between the interior of the frame and the outer frame grooves. These parts are headed over in the area of the grooves to secure the pole plates to the frame. The frame, with assembled field coils and pole plates, is press fitted to a tubular outer motor frame and end frames are secured to the main frame by through bolts that extend through the outer grooves of the field frame.

4 Claims, 8 Drawing Figures

DYNAMOELECTRIC MACHINE FIELD ASSEMBLY

This invention relates to a field assembly for dynamoelectric machines and more particularly to a field assembly for electric internal combustion engine cranking motors.

In the past the field assembly of direct current dynamoelectric machines, such as electric internal combustion engine cranking motors, have used a tubular steel outer frame and the interior of which is fitted with separate pole shoes and field coils. The pole shoes must be individually secured to the interior of the frame and the pole shoes serve to retain the field coils in place as well as providing a flux path to the armature of the dynamoelectric machine.

In another type of field assembly, disclosed in the U.S. Pat. to Todd et al., No. 3,624,441, a one piece field frame is disclosed which has integral poles and arcuate pole plates fixed to the ends of the poles to provide flux distribution and field coil retention.

The field assembly of this invention includes a one piece field frame that is formed of compacted atomized iron powder. The frame has integral radially extending pole portions which carry pole plates. One of the advantages of this arrangement is that the field assembly can be manufactured to close tolerances to provide a uniform air gap with the armature of the dynamoelectric machine.

It accordingly is one of the general objects of this invention to provide a field assembly for a dynamoelectric machine wherein the field frame is formed of highly compacted powdered iron.

Another object of this invention is to provide a field assembly of the type described wherein the outer surface of the one piece field frame has a plurality of outer longitudinally extending grooves that are aligned with radially inwardly extending integral pole portions. The integral pole portions are fitted with pole face plates which have fastener means extending therefrom that pass through openings formed in the frame that terminate in the outer grooves. The ends of the fastener means are headed over in the grooves to retain the pole face plates securely fastened to the frame.

Still another object of this invention is to provide a field and housing assembly for a dynamoelectric machine wherein a one piece field frame member, which has pole plates and field coils affixed thereto, is press fitted into an outer frame of the dynamoelectric machine. In carrying this object forward the inner frame is provided with outer grooves and through bolts which connect the end frames of the dynamoelectric machine to the outer frame pass through the outer grooves. With this arrangement the through bolts are disposed externally of the inner frame so as to be away from the field coils with the result that there is less likelihood of a short between the field coils and the through bolts.

IN THE DRAWINGS

Figure 1:
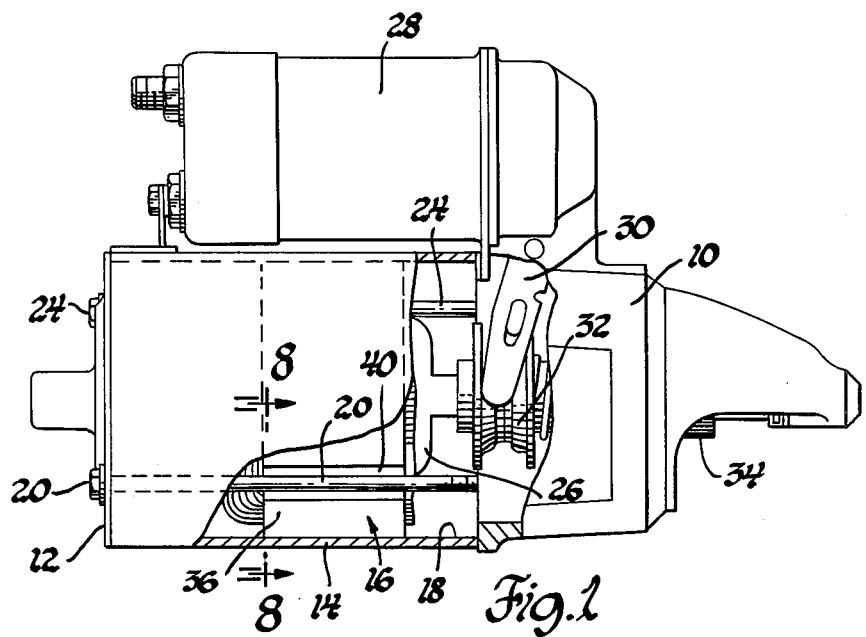
FIG. 1 is a side view with parts broken away of an electric internal combustion engine cranking motor having the field assembly of this invention.
Figure 2:
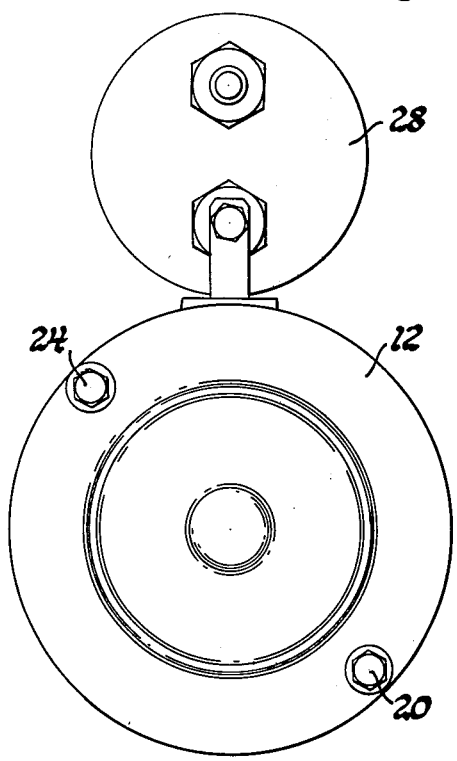
FIG. 2 is an enlarged end view of the cranking motor shown in FIG. 1.

Referring now to the drawings, and more particularly to FIG. 1, an electric cranking motor for an internal combustion engine is illustrated. This electric cranking motor has a drive end frame 10, a commutator end frame 12 and a tubular steel outer frame designated by reference numeral 14. The tubular outer frame supports a field frame assembly generally designated by reference numeral 16, certain outer arcuately extending portions of which have a press fit with the inner wall 18 of the outer frame 14. The end frames 10 and 12 engage the respective ends of the outer frame 14 and are fixed thereto by through bolts 20 and 24 each of which has a hexagonal head and an adjacent annular flange portion that engages the frame 12. The opposite ends of the through bolts are threaded into openings formed in the frame 10 which are not illustrated.

The cranking motor has an armature 26 that rotates within in the field frame assembly 16. The armature 26 has an armature shaft which is rotatably supported in suitable bearings located in the end frames 10 and 12 as is known to those skilled in the art. The armature 26 is provided with a commutator, not illustrated, which engages brushes which are also not illustrated. The cranking motor has the usual solenoid 28 connected with a shift lever 30 that is operative to move a shaft collar 32 to move a pinion 34 into mesh with the ring gear of an internal combustion engine.

Figure 3:
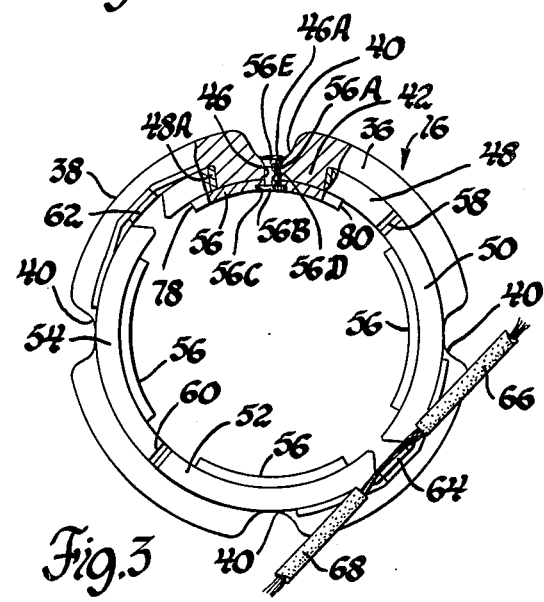
FIG. 3 is an end view with parts broken away of a field assembly made in accordance with this invention.
Figure 4:
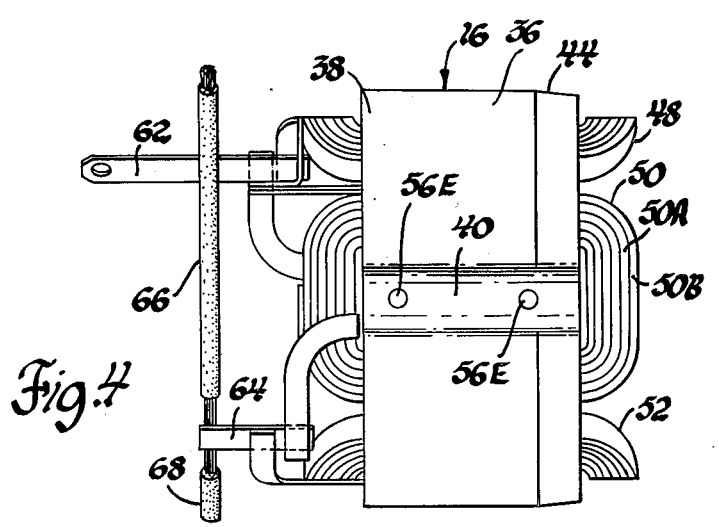
FIG. 4 is a side view of the field assembly shown in FIG. 3.

The field assembly 16 is shown in detail in FIGS. 3 and 4. This field assembly comprises an inner metal frame generally designated by reference numeral 36 and shown in detail in FIGS. 5 and 6. The inner frame 36 is formed as a one piece part and is formed by highly compacting atomized iron powder in the molding dies of a press which have the appropriate configuration to form part 36. The bulk of the atomized iron may have a particle size of approximately 150 microns and is compacted at a pressure of approximately 60 tons per square inch. After the part is compacted it is sintered and this is followed by a sizing operation. The frame 36 has the desired magnetic properties for dynamoelectric machine use.

Figure 5:
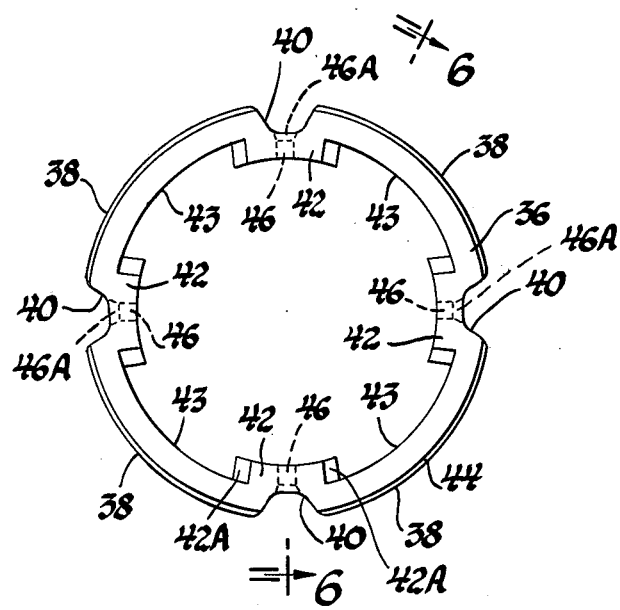
FIG. 5 is an end view of an inner frame made in accordance with this invention.
Figure 6:
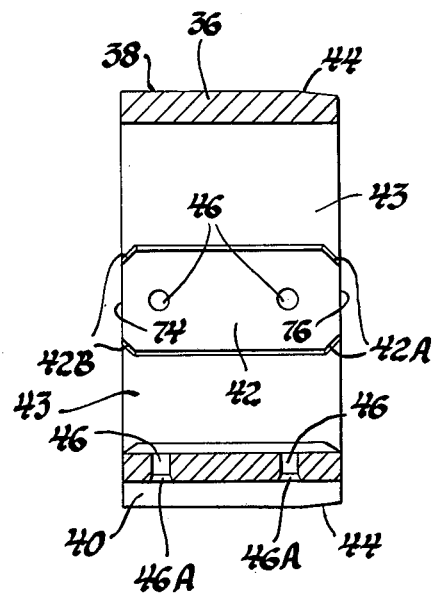
FIG. 6 is a sectional view taken along lines 6—6 of FIG. 5.

It can be seen from FIGS. 5 and 6 that the one piece inner frame 36 has an outer circumferentially extending wall defined by arcuately extending portions 38. It is further seen that the outer arcuately extending portions 38 are separated by longitudinally extending grooves 40. The frame 36 has four integral pole portions 42 separated by inner arcuate walls 43. The pole portions 42 extend for the entire length of the inner frame 36 as shown in FIG. 6. These integral poles have chamfered or inclined corners 42A and 42B which permit easy assembly of a field coil about a pole portion. One end of the frame 36 has a tapered portion 44 which aids in press fitting the frame 36 to the interior of the outer frame 14 when the field assembly 16 is fitted to the interior of the outer frame 14.

The integral poles 42 are each provided with a pair of holes or openings 46 extending from the interior of frame 36 to the grooves 40. These holes may be formed by a punching operation. The holes or openings 46 terminate in outwardly flared portions 46A, the purpose of which is described hereinafter.

The inner frame 36 forms the main support for the field frame assembly 16 illustrated in FIGS. 3 and 4. The inner frame 36 is provided with four field coils 48, 50, 52 and 54 which are respectively disposed about a respective integral pole portion 42 of the one piece inner frame 36. The field coils are comprised of substantially rectangular aluminum conductor material having a suitable insulation for insulating a respective turn from an adjacent turn. The turns of the field coils are illustrated in FIG. 4 where two of the turns of field coil 50 have been designated by reference numerals 50A and 50B.

The inner turns of the respective field coils are disposed between respective pole face plates 56 and a respective inner wall of the frame 36. One example of this is illustrated in FIG. 3 where inner turns 48A of field coil 48 are shown disposed between plate 56 and the inner wall of frame 36. The pole face plates 56 are arcuately extending metal parts conforming to the shape of the arcuate end faces of poles 42 and are formed of magnetic material such as steel. One of these face plates is illustrated in detail in FIG. 7. Each face plate 56 has a pair of steel pins 56A secured thereto and extending therefrom. One method of securing the pins to the face plate is to provide openings in plates 56 having larger and smaller diameter portions 56C and 56D. A pin 56A is located within an opening and its end is tightly deformed into the larger diameter portion 56C to form portion 56B to thereby secure a pin 56A to plate 56. The deformation of the end of the pin can be accomplished in various ways and can be deformed by a spin-riveting operation in which a riveting tool is located at an angle to the longitudinal axis of the pin and is rotated and forced against the end of a pin to form portion 56B.

In assembling the field coils to the integral pole portions 42 the field coils are placed in the position shown in FIG. 3. The pole plates 56, with their attached pins 56A, are then assembled to the frame with the pins passing through the respective openings 46 formed in the frame 36. With a pole plate 56 suitably supported from inside the frame 36 the ends of the pins 56A are now upset or deformed into a respective outwardly flared part 46A of an opening 46. This deformed or upset portion is designated 56E and it fills the outwardly flared part 46A of the hole 46 to securely fasten a respective pole plate 56 to the pole portions 42 of the inner frame 36. The upsetting or deforming operation can be performed by any tool that is capable of forcing the end of a pin into outwardly flared part 46A and can be formed by a spin-riveting operation as described above.

The field coils 48 and 50 are connected at 58 while field coils 52 and 54 are connected at 60. The ends of field coils 48 and 54 are connected to a terminal 62 whereas the ends of field coils 50 and 52 are connected to a terminal 64 connected to conductors 66 and 68. The conductors 66 and 68 may be connected with the brushes of the motor which are not illustrated.

In assembling the dynamoelectric machine of this invention the inner field frame 36 is formed as has been described. The field coils and pole plates 56 are then assembled to the inner frame 36 as has been described to provide the completed field assembly 16 shown in FIGS. 3 and 4. The field assembly 16 is then inserted axially into frame 14 with the outer arcuately extending walls 38 of frame 36 having a tight press fit with the inner wall 18 of the outer frame 14. The tapered portion 44 of the frame 36 aids in the axial insertion of the field assembly 16 into the frame 14.

Figure 8:
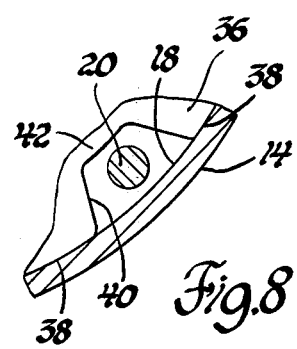
FIG. 8 is an enlarged fragmentary view looking in the direction of line 8—8 in FIG. 1 and illustrating how the through bolts pass through the outer grooves of the inner frame.

When the field assembly 16 has been assembled to the frame 14 the end frames 10 and 12 can then be secured to the frame 14. As previously explained the end frames 10 and 12 are fixed to the frame 14 by the through bolts 20 and 24 and the frame 14 is, in effect, clamped between end frames 10 and 12. In FIG. 8, which is an enlarged fragmentary view partly in section, looking in the direction of line 8—8 in FIG. 1, the through bolt 20 is illustrated. It is seen that the through bolt is disposed in one of the outer grooves 40 of the inner frame 36 so that the through bolt is external of the area containing the field coils. FIG. 8 also illustrates the tight press fit between the outer arcuate portions 38 of the field frame and the inner wall 18 of the outer frame 14 which serves to retain the frame 36 from movement relative to frame 14.

It will be appreciated from the foregoing that an electric motor has been described in which the frame 36 is formed of compacted atomized iron powder having integral pole portions that carry pole face plates. The pole plates are relatively light-weight parts as compared to motors fabricated with separate pole shoes and threaded types of fasteners, such as screws, are not used to secure the pole plates to the frame. Because of this, the plates remain securely fastened to frame 36 during use of the motor to maintain the proper air gap between the plate and armature of the motor. In addition, the motor of this invention facilitates assembly procedures since the frame assembly 16 can be readily fabricated and then axially inserted with a press fit into outer frame 14.

The shape of the field frame 36 is such as to minimize the amount of material required to manufacture the field assembly. Thus, the provision of grooves 40 saves material as compared to frames which have a continuous annular outer periphery. Even though the grooves 40 are provided, the cross section of the frame 36 is such as to not create a flux choke in any part of the frame as is evident from an inspection of FIG. 5. The field flux path is of course provided in part by the steel outer frame 14 when the field assembly 16 is assembled to the outer frame. In this regard, it is noted that a majority of the outer periphery of frame 36, namely arcuately extending walls 38, is in press fit contact with the inner wall 18 of frame 14. This is evident from an inspection of FIG. 5 which depicts the preferred relative circumferential spans of walls 38 and grooves 40. As can be seen from FIG. 5 the circumferential span of an arcuate wall 38 is greater than three times the circumferential span of a groove 40.

The radial wall thickness of outer frame 14 is less than the radial wall thickness of frame 36. As an example, the wall of frame 14 may be approximately 3 millimeters thick whereas the radial dimension between walls 38 and 43 of frame 36 can be approximately 6.2 millimeters. The radial dimension between the inner face of an integral pole 42 and the inner end of groove 40 adjacent flared portion 46A may also be approximately 6.2 millimeters.

As previously pointed out, the end of pins 56A are deformed into the outwardly flared portions 46A to secure the pole plates to the inner frame. The engagement of deformed portion 56E, with the inclined inner wall of flared portion 46A, prevents withdrawal of the pins from the openings. The outwardly flared portion 46A may also be characterized as a recess formed in the wall that defines groove 40. The recess is larger than the opening 46 to provide a wall about the end of opening 46 that is engaged by deformed portion 56E. The outwardly flared portion or recess 46A can take various shapes as long as a wall is provided which is engaged by the deformed end of a fastener device such as pin 56A.

Figure 7:
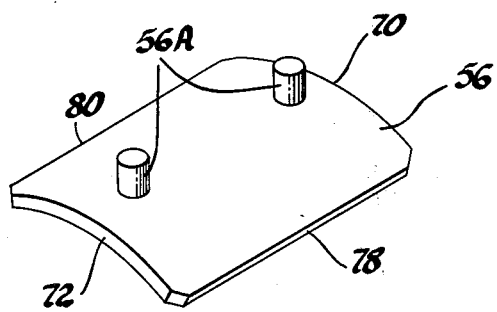
FIG. 7 is a perspective view of a pole face plate.

The pole face plate shown in the perspective view of FIG. 7 is on an enlarged scale as compared to its illustration in FIG. 3. It is to be understood that the length of plate 56 between edges 70 and 72 is the same as the length of pole portions 42 between the pole portion end faces 74 and 76. In addition, the spacing of holes 46 and pins 56A is the same so that the pins slide into the holes when the plates are assembled to the inner frame.

The arcuate distance between the pins 56A and the edge 78 of plate 56 is slightly longer than the arcuate distance between the pins 56A and the edge 80 of plate 56. The distance between the left pin 56A (FIG. 7) and the edge 72 of plate 56 is slightly longer than the distance between the other pin 56A an edge 70.

The pins 56A, holes 46 and plate 56 are all so dimensioned that when a plate 56 is properly assembled to the inner frame 36 the edges 70 and 72 of plate 56 are aligned respectively with end faces 74 and 76 of inner frame 36 and the longer arcuate portions of plate 56, between pins 56A and edge 78, extend in a counterclockwise direction as viewed in FIG. 3 and in the same direction as the direction of rotation of the armature of the motor. If an attempt is made to improperly assemble the plate 56 to inner frame 36, such that edges 78 would extend in an improper clockwise direction, as viewed in FIG. 3, this fact would be indicated because plate edge 72 would now extend beyond face 74 and plate edge 70 would be inside of face 76.

The reason for forming the plates 56 such that the longer arcuate portions (between pins 56A and edge 78) extend in the direction of rotation of the armature of the motor is to provide a flux distribution that permits the brushes of the motor to be set at a mechanically neutral position in spite of the effect of armature reaction, as is known to those skilled in the art.

The length of face plates 56, between edges 70 and 72, is substantially equal to the length of the core of the armature 26 and when the field assembly 16 is press fitted to frame 18 the face plates extend substantially coextensively with the core of armature 26. In the assembled position of field assembly 16 to frame 18 the tapered end 44 faces in the direction of end frame 10.

The magnetic powder that is compacted to form inner frame 36 has been described as atomized iron powder. The composition of this powder, prior to compacting, is preferably approximately 99% iron by weight. The powder may also contain as maximum amounts 0.03% carbon, 0.25% manganese, 0.025% sulphur, 0.02% phosphorous and 0.30% oxygen, all on a weight basis.

What is claimed is:

1. A field and housing assembly for a dynamoelectric machine comprising, a tubular outer frame member formed of magnetic material, a field assembly located within said outer tubular frame member, said field assembly including a unitary inner frame formed of magnetic material, said inner frame having an outer circumferentially extending wall defined by circumferentially spaced outer arcuate segments separated by circumferentially spaced axially extending grooves, said outer arcuate segments having a press fit with the inner wall of said outer frame, the inner wall of said inner frame being defined by circumferentially spaced inner arcuate segments separated by circumferentially spaced radially inwardly extending integral pole portions having arcuate end faces, said pole portions being aligned with said grooves, a field coil disposed about each integral pole portion, an arcuate pole plate engaging each end face of a pole portion for retaining said field coils in position between said pole plates and said inner wall of said inner frame, a plurality of openings extending through each pole portion that communicate with said grooves, means for securing a respective pole plate to a respective pole portion comprising fastener means carried by and extending from a respective pole plate located in said openings, first and second end frames respectively engaging opposite ends of said outer frame, and end frame fastener means extending between and secured to said end frames for clamping said outer frame between said end frames, each said end frame fastener means extending through a respective space defined by a respective groove wall and an inner wall of said outer frame.

2. A field assembly for dynamoelectric machine that is adapted to be press fitted as a unit to an inner wall of the outer frame of the dynamoelectric machine comprising, a unitary frame member formed of highly compacted fine particle size magnetic powder, said frame member having an outer circumferentially extending wall defined by circumferentially spaced outer arcuate segments separated by circumferentially spaced axially extending grooves, said outer segments adapted to be press fitted to the inner wall of an outer frame of a dynamoelectric machine, the inner wall of said frame member being defined by circumferentially spaced inner arcuate segments separated by circumferentially spaced radially inwardly extending integral pole portions having arcuate end faces, a field coil disposed about each said integral pole portion, an arcuate pole plate formed of magnetic material engaging each end face of a pole portion for retaining said field coils in position between said pole plates and said inner wall of said frame member, a plurality of openings extending through each integral pole portion that terminate in said grooves, and fastener means carried by and extending from a respective pole plate located in said opening formed in said pole portions, the ends of said fastener means located adjacent a groove wall having deformed portions engaging said frame member for securing said pole plates to said frame member.

3. A field and housing assembly for a direct current dynamoelectric machine comprising, a tubular outer frame formed of magnetic material, a field assembly located within said outer frame, said field assembly including a one-piece inner frame formed of highly compacted fine particle size magnetic powder, said inner frame having an outer circumferentially extending wall defined by spaced outer arcuately extending segments separated by circumferentially spaced axially extending grooves, said outer arcuate segments having a press fit with the inner wall of said outer frame, the inner wall of said inner frame having a plurality of circumferentially spaced radially inwardly extending integral pole portions, a field coil disposed about each said integral pole portion, a pole plate formed of magnetic material engaging each end face of an integral pole portion for respectively retaining said field coils in position between said pole plates and said inner wall of said inner frame, means carried by and extending from said pole plates positioned in openings formed in said inner frame for securing said pole plates to said inner frame, first and second end frames respectively engaging opposite ends of said outer frame, and end frame fastener means extending between said end frames for clamping said outer frame between said end frames, each said end frame fastener means extending through a respective space defined by a said respective groove and an inner wall of said outer frame, said inner frame and outer frame forming a flux path for flux generated by said field coils, the radial thickness of said outer frame being less than the radial thickness of said inner frame.

4. A field assembly for a dynamoelectric machine that is adapted to be press fitted as a unit to an inner wall of the outer frame of the dynamoelectric machine comprising, a unitary frame formed of magnetic material having an outer circumferentially extending wall defined by circumferentially spaced outer arcuately extending segments separated by circumferentially spaced axially extending grooves, said outer arcuate segments constituting a majority of the outer area of said frame member, the inner wall of said frame being defined by circumferentially spaced inner arcuate segments separated by circumferentially spaced radially inwardly extending integral pole portions having arcuate end faces, a field coil disposed about each of said integral pole portions, an arcuate pole plate formed of magnetic material engaging each end face of a pole portion for respectively retaining said field coils in position between said pole plates and said inner wall of said frame, a plurality of openings formed in each integral pole portion, each opening extending between the interior of said frame and a recess formed in the outer wall of a groove, each recess providing wall means disposed about the end of a respective opening, and fastener means carried by and extending from a respective pole plate located in said openings formed in said pole portions, the ends of said fastener means having deformed portions located in said recesses and engaging said wall means for securing said pole plates to said frame member.

* * * * *